3,176,050
FULLY CURABLE UNSATURATED POLYESTERS TREATED WITH ALLYL ALCOHOL
Yun Jen and James A. Seneker, Anaheim, Calif., assignors to California Research Corporation, San Francisco, Calif., a corporation of Delaware
No Drawing. Filed May 27, 1960, Ser. No. 32,099
4 Claims. (Cl. 260—861)

This invention relates to unsaturated alkyds or polyesters copolymerizable with a compound containing the polymerizable $CH_2=C<$ group to a non-tacky surface-cured composition. More particularly, the invention has to do with the incorporation in the unsaturated alkyd of a minor amount of allyl alcohol, the resulting unsaturated alkyd being then copolymerizable with the aforesaid polymerizable compound to produce a fully curable composition.

Polyester systems comprising unsaturated alkyds and polymerizable monomers containing ethylenic unsaturation, e.g., styrene, can be copolymerized, usually in the presence of a peroxygen catalyst, to hardened, infusible resinous compositions especially useful in surface coating applications. Complete polymerization of the aforesaid polyester systems on the surface is, however, inhibited or prevented by atmospheric oxygen, with the result that the potential degree of hardening possessed by these systems is not attained.

As a result, polyester surfaces exposed to air or atmospheric oxygen remain soft and tacky, or are sensitve to the action of solvents, even though they appear to have a high degree of hardness. It is apparent that the polymerization-inhibiting effect of air, thereby causing poor surface-cure due to incomplete polymerization, is a disadvantage in such surface coating applications as furniture finishes and tileboard enamels.

Accordingly, it has heretofore been proposed to solve the air-inhibition problem by incorporating a small amount of wax in the polyester system, thus forming a surface barrier between the polyester and air. The presence of wax, however, results in a film which is low in gloss and which has a mottled appearance.

According to the present invention, there are produced completely polymerizable, fully hardenable resinous mixtures of unsaturated polyesters and the polymerizable ethylenically unsaturated monomer, more specifically a vinylidene monomer, by the reaction of the base unsaturated polyester with the allyl alcohol followed by admixture with the copolymerizable monomer. In other words, it has been found that unsaturated polyesters of the type described above can be treated with the allyl alcohol so that the curing process is immune from the polymerization-inhibiting effect of atmospheric oxygen, as a result of which polymerization and/or copolymerization is permitted to go to completion, and the mixture cures throughout its mass, thereby providing a non-tacky surface-cured, solvent-resistant composition. A significant advantage of the invention resides in the fact that the compositions prepared in accordance with the invention can be fully curable at room temperatures. At elevated temperature, the curing process is accelerated.

Moreover, the polyester composition of the present invention, when spread into thin films and properly catalyzed, has the ability to cure at room temperature even without a vinylidene monomer under the atmosphere of air. In utilizing the present polyester composition in combination with a vinylidene monomer, it may sometimes become difficult to control the actual ratio of the polyester to monomer in a thin film, due to the loss of monomer by evaporation. It is believed that the actual ratio of the film is not important. While the mechanism of curing of the polyester composition by itself may be different from that of copolymerization with a vinylidene monomer, it is generally advantageous to dissolve the polyester composition in a vinylidene monomer so that the resin is reduced to a workable viscosity.

More specifically, it has been found that the polymerization-inhibiting effect of air on unsaturated polyesters can be prevented by reacting allyl alcohol with an unsaturated polyester of substantially low acid number, e.g., 10 to 50, of a dihydric alcohol and of a carboxylic acid esterfying material at least 50 mol percent of which is an ethylenically unsaturated acid-reacting compound selected from the group consisting of alpha unsaturated, alpha,beta polycarboxylic acids, or their anhydrides, such as maleic acid and maleic anhydride, and heating the resulting mixture at reflux temperatures. The amount of added allyl alcohol resides in the range 0.25 mol to 1.2 mols per mol of the unsaturated acid or anhydride employed in the manufacture of the unsaturated polyester. As mentioned, the allyl alcohol is reacted with or incorporated in the unsaturated alkyd at the reflux temperatures of the mixture. The boiling point of the allyl alcohol is quite low, and hence at the beginning of the reaction, since there is much unreacted alcohol, the refluxing temperatures will be relatively low, reflux starting temperatures being around 115° C. As the reaction reaches completion and ally alcohol is consumed, the reflux temperature of the mixture rises, which may be up to 200° C. Reaction of allyl alcohol and unsaturated polyester is considered complete when the reflux temperature reaches 200° C. or some lower plateau temperature above which it will not rise. This may require a period of time ranging from 5 to 50 hours, a shorter reaction time being possible by the use of a catalyst, such as an alkali metal alkoxide. The reaction between an allyl alcohol and a polyester containing the unsaturated double bond can be carried out either at atmospheric pressure or under higher pressures. Accordingly, the reaction rate will be faster under higher pressure since a higher operating temperature is then feasible.

In proceeding in this manner, reaction between alcohol and the unsaturated alkyd occurs by 1,2 addition across the double bond of the alkyd, the alkyd at this point becoming saturated and being attached to the alcohol through ether linkage, the unsaturated bond of the alcohol then serving as a cross-linking spot for the later polymerization. The unsaturated alkyd modified as above is treated in conventional fashion with a copolymerizable monomer containing the polymerizable group $CH_2=C<$.

The unsaturated polyester compositions of the type herein contemplated are prepared in known fashion, i.e., by reacting or esterifying an appropriate alcohol, usually a dihydric alcohol, such as diethylene glycol, with the appropriate acid or acid anhydride, such as maleic anhydride and fumaric acid. The reaction can be carried out at temperatures of about 150° to 250° C. in an atmosphere of inert gas, such as nitrogen, or carbon dioxide, water formed during reaction being removed by distillation. In some instances a solvent may be employed at this stage, the solvent serving to form azeotropes with the water, and thereby aiding in its removal, and to reduce corrosion. Certain petroleum fractions, such as toluene or xylene, usually employed in an amount of less than 10% by weight of the reactants, are mentioned as examples. If desired, the esterification reaction may be catalyzed by acids or acid salts, soluble in the reaction mixture, for example, p-toluene sulfonic acid or triphenyl phosphite. Premature cross-linking of the double bonds during esterification and consequently gelation, may be obviated by the use of inhibitors, such as hydroquinone, resorcinol, pyrogallol, tertiarybutyl catechol, phenylene diamines, aniline, benzaldehyde or ascorbic acid. While in general approximately equivalent proportions of alcohol and acid material can be employed a slight stoichiometric excess of glycol from 3 to 5 mol percent over combined acid material is preferably employed to compensate for loss of glycol material during reaction and to control molecular weight. The extent of reaction can be followed by acid number determinations (acid number being defined as the number of milligrams of potassium hydroxide equivalent to the free acid in one gram of resin) and by viscosity determinations in an appropriate solvent, in accordance with common practice acid number determinations alone being satisfactory where the manufacturing process has been standardized. In general, polyesterification is conducted to a resin of acid number below 50, and preferably below 25 to as low as 10 and lower. The polyester resins are then reacted with allyl alcohol. Subsequently, the product of the esterification reaction is admixed with the copolymerizable monomer, e.g., styrene, in amounts generally ranging from 10 to 60% usually 15 to 40%, again the mixture being treated, if desired, with known gelation inhibitors, final polymerization then being effected in the presence of a polymerization catalyst, such as the well-known peroxide catalysts.

As indicated, the unsaturated polyester systems to be treated in accordance with the invention are well known in the art, for example, in U.S. Patent No. 2,443,741. The unsaturated alkyd portion of the polyester system is generally prepared by the reaction of an alpha unsaturated, alpha,beta polycarboxylic acid or anhydride with a glycol. Typical examples of polybasic acids and anhydrides which may be used to prepare the unsaturated alkyds are maleic and fumaric. The foregoing polybasic acids or anhydrides may be esterified with such dihydric alcohols as ethylene glycol, diethylene glycol, triethylene glycol, 1,2-propylene glycol, 1,2- or 1,3-dipropylene glycol, 1,3-propylene glycol, 1,3-butylene glycol, 1,2-butylene glycol, 1,4-butanediol, neopentyl glycol, 1,3-pentanediol, 1,5-pentanediol. The preferred glycol material is one which contains ether linkage, such as diethylene glycol and triethylene glycol.

The above polyesters may be modified by adding to the esterification reaction other modifying acids or anhydrides, such as, for example, itaconic, aconitic, mesaconic, citraconic, ethyl maleic, dichloromaleic, 3,6-endomethylenetetrahydrophthalic and hexachloroendomethylenetetrahydrophthalic acid or anhydride, benzoic acid, toluic acid, phthalic, terephthalic, isophthalic, trimellitic, pyromellitic, oxalic, malonic, succinic, adipic, suberic, azelaic, and sebacic acids and anhydrides or their derivatives, such as the halogenated derivatives of the aforementioned acids or anhydrides, an example of which is tetrachlorophthalic acid. As indicated above, however, of total polycarboxylic acid employed in the manufacture of the unsaturated alkyd, at least 50 mol percent is the unsaturated polybasic acid hereinabove described.

Since, as indicated above, the manner in which the polyesterification is to be accomplished is not at the essence of the present invention, a part of the glycol may be reacted first with phthalic anhydride before the addition of the rest of the glycol with maleic anhydride. Likewise, it may be desirable to react all of the gylcol with all the maleic anhydride before phthalic anhydride is introduced. In some cases, it may be advantageous to react all of the glycol with the modifying polybasic acid, such as isophthalic acid, until an acid number value of below 10 is obtained, before the maleic anhydride is added.

The polymerizable monomer containing ethylenic unsaturation is likewise well known in the art and is more fully described in U.S. Patents Nos. 2,443,735 and 2,407,479. Typical polymerizable compounds containing ethylenic unsaturation include the various polymerizable monomers containing vinyl or vinylidene groups, for example, styrene, alkyl substituted styrene, such as vinyl toluene, halogenated styrene, divinyl benzene, acrylic and methacrylic acids and their derivatives, including the nitriles, the amides and the esters of said acids; indene; vinyl heterocyclic compounds, such as vinyl pyrrolidone; aliphatic and aromatic allyl, diallyl and triallyl compounds, such as allyl acetate, diallyl phthalate, diallyl isophthalate, triallyl cyanurate; inorganic allyl compounds, such as triallyl phosphate, etc. Also included are the esters of monohydric unsaturated alcohols, such as allyl, vinyl or methallyl alcohol, with mono- or polybasic acids, such as acetic, propionic or succinic acid. Moreover, the ethylenically unsaturated compound may also be an ester of an alpha unsaturated alpha,beta dicarboxylic acid, such as maleic, fumaric, itaconic, etc. and a monohydric alcohol, such as methyl, ethyl, propyl alcohol, etc. In addition, the ethylenically unsaturated compound can be a mixture of two or more compounds mentioned above.

The following examples illustrate the practice of the invention.

*Example 1*

Into a two-liter three-neck flask equipped with stirrer, thermometer, inert gas inlet tube, fractionating column arranged to separate water from propylene glycol vapors, and heating mantle, was charged 290 g. (2.82 mols) of propylene glycol and 376 g. (2.26 mol) of isophthalic acid. The batch was heated gradually to 220° C. while maintaining the vapor temperature at the top of the fractionating column below 104° C. At an acid number of 5, the temperature was lowered to 200° C. and 263 g. (2.68 mols) of maleic anhydride and 0.12 g. of triphenyl phosphite were added. The batch was heated to 185° C. under total reflux. After 20 to 30 minutes, the reflux temperature dropped to 175° C. At this point, 71 g. of propylene glycol were added and the fractionating column was installed to remove water and return propylene glycol to the cook. Cooking was continued at 200° C. to an acid number of 15. The resin was dropped, cooled and crushed. Yield, 1000 grams.

Into a two-liter, three-neck flask equipped with stirrer, thermometer, inert gas inlet tube, total condensor, addition funnel, and heating mantle were charged 938 g. of the above polyester resin. This was heated to 205° C. and 60 g. of allyl alcohol were added through the addition funnel. The reflux temperature dropped to 130° C. Vigorous reflux was maintained for 5½ hours, during which time the temperature gradually rose to 207° C. The total reflux condenser was removed and a Dean-Stark trap substituted to remove unreacted allyl alcohol. Fifty milliliters of toluene were dropped in, while holding the reaction temperature at 210° to 215° C. to strip off unreacted allyl alcohol. The resin was cooled to 170° C. and cut to 70% nonvolatile in toluene.

A film, prepared from a mixture of 100 g. of the above allyl alcohol-modified polyester solution, 30 g. of styrene, 0.65 g. of 6% cobalt naphthenate, and 1.30 g. of 60% methylethylketone peroxide in dimethyl phthalate, was spread out at 20 mil thickness on a piece of wood. This film was only slightly air-inhibited after two days at room temperature. The base polyester, before modification with allyl alcohol, was strongly inhibited by air.

*Example 2*

Into a two-liter three-neck flask equipped with stirrer, thermometer, fractionating column, condenser, inert gas inlet tube, addition funnel, and heating mantle were charged 500 g. (5.10 mols) of maleic anhydride and 427 g. (5.62 mols) of propylene glycol. The batch was heated to 200° to 210° C. and held at this temperature until 65 ml. of water had been removed (approximately 2 hours). The fractionating column was replaced by a total reflux condenser and 166 g. (2.86 mols) of allyl alcohol were dropped through the addition funnel. The reflux temperature dropped to 130° C. Refluxing was continued for 24½ hours, during which time the reflux temperature rose to 192° C. The unreacted allyl alcohol was stripped off at 215° C. After cooling to 120° C., 0.01% hydroquinone, 0.002% copper (as naphthenate) and 427 g. of styrene were added.

Films of the above allyl alcohol modified polyester plus 0.5% of 6% cobalt naphthenate and 1.5% of 60% methylethylketone peroxide in dimethyl phthalate cured to a tack-free, solvent resistant condition after baking for two hours at 140° F.

*Example 3*

Into a five-liter three-neck flask equipped with stirrer, thermometer, Dean-Stark trap, condenser, inert gas inlet tube, addition funnel, and heating mantle, were charged 1335 g. (13.62 mols) of maleic anhydride and 1515 g. (14.30 mols) of diethylene glycol. The reaction mixture was heated to 200° to 210° C. until an acid number of 58 was obtained (approximately two hours). The temperature was then raised to 245° C. for 90 minutes. The acid number at this point was 37. The batch was cooled to 120° C., a total reflux condenser was installed, and 395 g. (6.81 mols) of allyl alcohol were added. Heating under total reflux was continued for 46 hours, during which time the reflux temperature rose from 115° to 179° C. Thirty-eight milliliters of unreacted allyl alcohol plus water were stripped off at 210° C. The batch was cooled to 120° C. and 0.0083% hydroquinone and 0.0004% copper (as naphthenate) were added.

A film, prepared as before, from a mixture of 70 g. of the above allyl alcohol modified polyester plus 30 g. of styrene, 0.5 g. of 6% cobalt naphthenate, and 1.5 g. of 60% methylethylketone peroxide in dimethyl phthalate, cured to a tack-free, solvent-resistant condition in about two days at normal room temperature. The film was very tough and flexible.

Obviously, many modifications and variations of the invention, as hereinbefore set forth, may be made without departing from the spirit and scope thereof, and therefore, only such limitations should be imposed as are indicated in the appended claims.

We claim:

1. Process of treating an unsaturated polyester to render it surface curable, which comprises adding allyl alcohol to said unsaturated polyester obtained by esterifying to an acid number below about 25 a dihydric alcohol and a carboxylic acid material esterifiable therewith, including an ethylenically unsaturated acid-reacting compound selected from the group consisting of alpha unsaturated, alpha,beta-polycarboxylic acids and their anhydrides said dihydric alcohol being used in a stoichiometric excess of up to 5 mol percent over combined acid material, heating the resulting mixture at refluxing temperatures to effect addition of said allyl alcohol to the ethylenic bond of said unsaturated compound, said unsaturated polyester containing the ethylenically unsaturated acid-reacting compound in an amount of at least 50 mol percent of total carboxylic acid material, the allyl alcohol being employed in a proportion ranging from 0.25 mol to 1.2 mol for each mol of the ethylenically unsaturated acid-reacting compound, the treated resin being further capable of copolymerization with a monomer containing the group $CH_2=C<$ at the ethylenic bond of the allyl acohol to produce a completely polymerizable, fully hardenable, resinous mixture.

2. Process for preventing the polymerization-inhibiting effect of air on unsaturated polyesters which comprises forming a mixture of allyl alcohol and preformed unsaturated polyester of a dihydric alcohol and of a carboxylic acid esterifying material at least 50 mol percent of which is an ethylenically unsaturated acid-reacting compound selected from the group consisting of alpha unsaturated alpha,beta polycarboxylic acids and their anhydrides, said dihydric alcohol being used in a stoichiometric excess of up to 5 mol per cent over combined acid material, the allyl alcohol being employed in an amount ranging from 0.25 mol to 1.2 mols per mol of ethylenically unsaturated compound, heating the mixture at reflux temperatures to effect addition of said allyl alcohol to the ethylenic bond of said ethylenically unsaturated acid-reacting compound, and admixing with the ally alcohol-modified unsaturated polyester a monomer containing the polymerizable group $CH_2=C<$ copolymerizable with the resin to a hard, infusible state.

3. Process according to claim 1, wherein the ethylenically unsaturated acid-reacting compound is maleic anhydride.

4. Process according to claim 2, wherein the copolymerizable monomer is styrene and the ethylenically unsaturated acid-reacting compound is maleic anhydride.

References Cited by the Examiner
UNITED STATES PATENTS

| 2,255,313 | 9/41 | Ellis | 260—45.4 |
|---|---|---|---|
| 2,280,242 | 4/42 | Kropa | 260—45.4 |
| 2,407,479 | 9/46 | D'Alelio | 260—45.4 |
| 2,443,735 | 6/48 | Kropa | 260—45.4 |
| 2,443,741 | 6/48 | Kropa | 260—45.4 |
| 2,606,883 | 8/52 | Hoover | 260—45.4 |
| 2,852,487 | 9/58 | Maker | 260—45.4 |

FOREIGN PATENTS 810,222    3/59    Great Britain.

OTHER REFERENCES

Ishida: "Thermoplastic Polyester Resin," Chemical Abstracts, vol. 51, March-April 1957, page 4058e.

References Cited by the Applicant
UNITED STATES PATENTS

| 2,255,313 | 9/41 | Ellis. |
|---|---|---|
| 2,280,242 | 4/42 | Kropa. |
| 2,407,479 | 9/46 | D'Alelio. |
| 2,443,735 | 6/48 | Kropa. |
| 2,443,741 | 6/48 | Kropa. |
| 2,606,883 | 8/52 | Hoover. |
| 2,852,487 | 9/58 | Maker. |

FOREIGN PATENTS 810,222    3/59    Great Britain.

OTHER REFERENCES

Ishida, Chemical Abstracts, vol. 51, March-April 1957.

WILLIAM H. SHORT, *Primary Examiner.*

D. ARNOLD, L. J. BERCOVITZ, *Examiners.*